United States Patent [19]
Mainwaring

[11] Patent Number: 5,863,443
[45] Date of Patent: Jan. 26, 1999

[54] IN-LINE AGRICULTURAL WATER FILTER WITH DIVERTER TUBE AND FLUSH VALVE

[76] Inventor: Timothy Mainwaring, 2206 W. 19th Ave., Kennewick, Wash. 99337

[21] Appl. No.: 876,808

[22] Filed: Jun. 16, 1997

[51] Int. Cl.⁶ .......................... B01D 37/00; B01D 35/16; B01D 21/00
[52] U.S. Cl. .......................... 210/800; 210/248; 210/437; 210/440; 210/441; 210/443; 210/456
[58] Field of Search .................. 210/443, 444, 210/445, 459, 767, 791, 800, 248, 437, 440, 441, 456

[56] References Cited

U.S. PATENT DOCUMENTS

| | | | |
|---|---|---|---|
| 739,562 | 9/1903 | Selg et al. | 210/443 |
| 908,308 | 12/1908 | Mueller | 210/443 |
| 1,152,831 | 9/1915 | Monteagle | 210/443 |
| 1,251,601 | 1/1918 | Weiwoda | 210/443 |
| 1,508,480 | 9/1924 | Skinner | 210/443 |
| 1,590,128 | 6/1926 | Staples | 210/443 |
| 1,630,287 | 5/1927 | Amdursky | 210/443 |
| 2,125,532 | 8/1938 | Wells | 210/443 |
| 3,959,140 | 5/1976 | Legras | 210/107 |
| 4,043,915 | 8/1977 | Man | 210/195 |
| 5,087,355 | 2/1992 | Godec | 210/136 |
| 5,132,013 | 7/1992 | Thompson | 210/448 |
| 5,595,656 | 1/1997 | Yun | 210/446 |

*Primary Examiner*—Robert Popovics
*Attorney, Agent, or Firm*—Jeffrey B. Oster

[57] ABSTRACT

A filter device used to remove organic and inorganic debris from a liquid stream, such as irrigation water. The device comprises a diverter tube having a plurality of apertures therein to divert a significant portion of the liquids entering the device onto a filter screen, thereby filtering out the lighter debris on the screen. A portion of the liquid flows through the diverter tube with the heavier debris entrained therein, which settles out by gravity in a dead water zone at the lowermost end of the device. A flush valve can be opened, permitting the heavier debris to be swept out, and back-flushing the lighter debris off of the filter screen.

11 Claims, 4 Drawing Sheets

IN-LINE AGRICULTURAL WATER FILTER WITH DIVERTER TUBE AND FLUSH VALVE

CROSS-REFERENCE TO RELATED APPLICATIONS

"Not applicable"

STATEMENT REGARDING FEDERALLY SPONSORED RESEARCH OR DEVELOPMENT

"Not applicable"

BACKGROUND OF THE INVENTION

The production of a major portion of agricultural crops in the Western United States depends upon irrigation, since natural precipitation is insufficient to support anything other than, for example, natural grassland grazing or winter wheat. Water for irrigation may come from a number of sources, including surface impoundments (such as lakes and reservoirs), canals, deep wells, and the like. In many of these applications, especially in the use of surface water, the water stream naturally entrains a significant quantity of solid debris Irrigation water from wells may contain substantially less organic contaminants (such as vegetable matter—weeds, grass, etc.) than does surface water, while both sources of water may contain significant quantities of inorganic contaminants, such as sand. In almost all cases, the irrigation water must be pumped, and it is then often applied to the crop land through sprinklers. When such water is directed through pumps, both the organic and inorganic contaminants may clog up the pump mechanism. Whether or not pumps are or may be clogged by such contaminants, virtually all sprinkler systems are susceptible to clogging with either the heavier inorganic or the lighter inorganic materials.

For years the only method of filtering such materials from irrigation water comprised a simple screen against which the water stream was directed. While such screens work on a gross level, constant supervision is necessary to assure cleaning when/if they became plugged. Later, technology was developed to make essentially automatic operation of such filters possible.

A number of United States patents illustrate representative attempts to solve the problem of removing debris from irrigation water. For example, in U.S. Pat. No. 5,132,013, a perforated frusto-conical filter apparatus is positioned within a housing such that unfiltered irrigation water is directed into the filter. Filtered water is discharged through the filter and out an exit. The bottom of the filter is open so that heavier materials will settle out by gravity, and a drain plug is provided to clean the filter. For cleaning the filter, the device is isolated and the filter media is removed therefrom to remove debris from the perforated filter. In U.S. Pat. No. 3,959,140, a filter device is disclosed that comprises an outer housing with a cylindrical perforated filter therein. Irrigation water is directed into the filter, which then passes through the filter and is discharged. A brush device is provided inside the filter which permits the inner surface of the filter to be cleansed, either manually or automatically. A drain is located at the lowermost end of the housing. Pressure sensing devices are provided so that when a sufficient pressure differential between the outside and inside of the filter within the housing is sensed (an indication of a plugged filter), the water outlet is closed and the drain is opened. The brush is then activated and matter adhered to the inside of the screen is flushed away.

Finally, a conical filter member (small end down) within a housing is disclosed in U.S. Pat. No. 4,043,915. Water is directed into the larger upper end and as it is passed through the filter media, solids entrained in the water are concentrated in the lower, smaller end thereof. A drain flushes away these solids, which are carried to a settling container, where the solids are further concentrated and removed.

While the above-noted devices perform their intended function to some degree, it is clear to those skilled in this art that an improved filter device is needed which can filter large quantities of water having relatively large concentrations of solid debris therein, all the while having the capability to automatically or easily be cleaned without disassembling the device.

BRIEF SUMMARY OF THE INVENTION

The present invention relates to a filter device for removing both heavy and light debris fractions from a liquid stream, such as organic and inorganic debris from irrigation water. The filter device comprises an elongate outer casing member having water inlet and outlet ports at a first end and a flush port at a second end. Water is directed into the device along a longitudinal axis through a diverter tube having a plurality of apertures therein. A screen member extends from the first to the second end between the diverter tube and the outer casing.

The apparatus is preferably aligned at an acute angle to the horizontal, with the flush port located at the relatively lower end. The flush port may be provided with either a manually- or automatically-operated valve. In operation, unfiltered liquid enters the device and is directed along a longitudinal axis by the diverter tube. A substantial portion of the water is diverted through the apertures and directed onto the screen; a second portion passes directly through the diverter tube and impacts a second end of the device. Relatively lighter debris entrained in the liquid stream exits the diverter tube apertures and impacts on the screen; relatively heavier debris settles out of the liquid stream impacting the second end of the device in a dead water zone.

The flush port is sized to accommodate an excess of the flow of the liquid stream entering the device. When the flush port is opened, the fluid pressure on the radially inner surface of the screen is less than the pressure on the outer surface of the screen, and the liquid reverses direction and sweeps the lighter material from the inner surface of the screen, and in conjunction with the heavier materials, is flushed out the flush port.

DETAILED DESCRIPTION OF THE INVENTION

Figure 1:
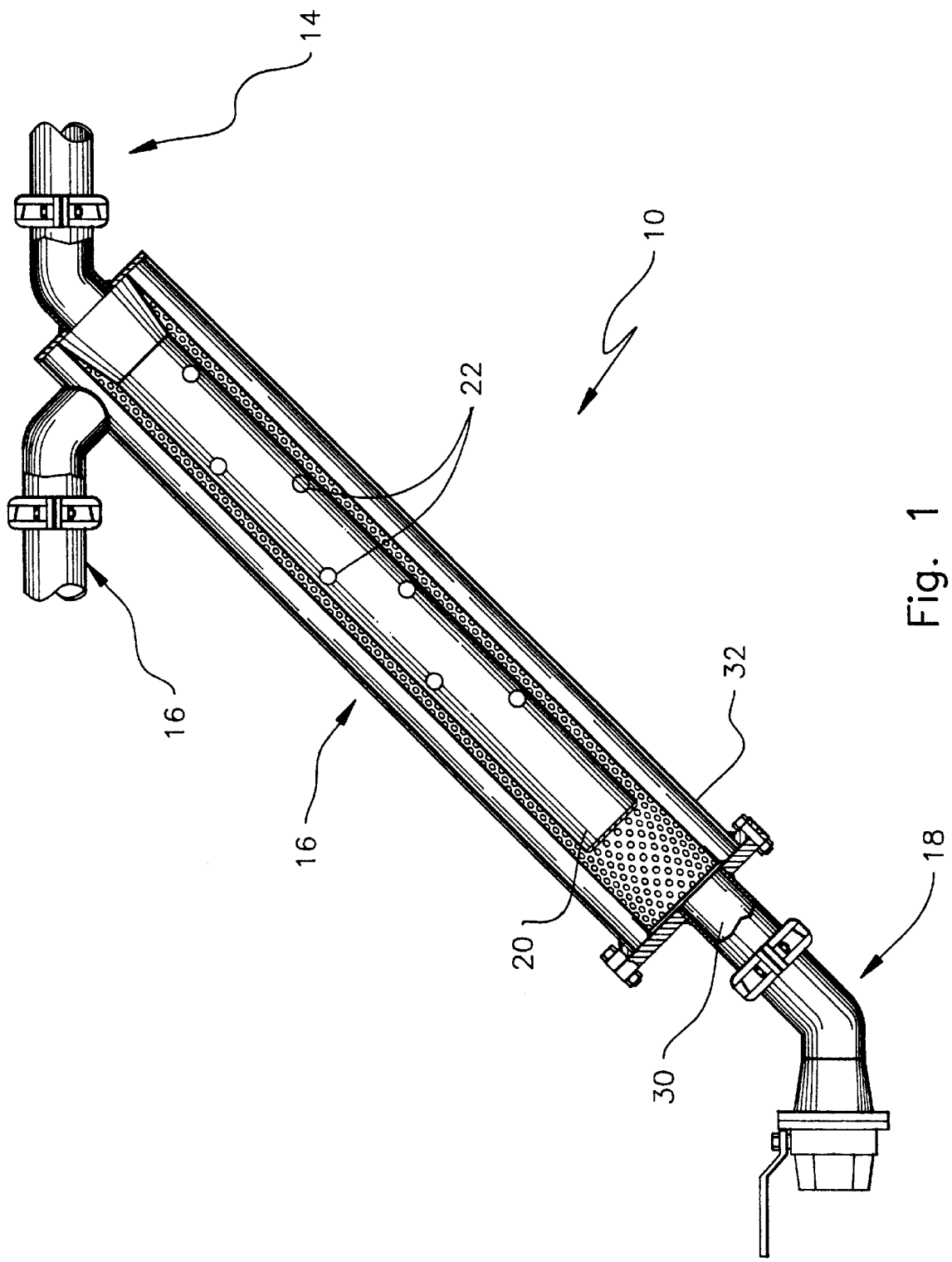
FIG. 1 is a view in broken perspective showing the filtering system of the present invention.

A preferred embodiment of the water filtration device of the present invention is illustrated in FIG. 1 of the drawings.

The filter device 10 comprises a cylindrical housing portion 12, unfiltered water inlet port 14, filtered water outlet port 16 and a flush port 18. As shown in sectional view in FIG. 1, the housing 12 contains a diverter tube 20 therein which is provided with a plurality of apertures 22 therethrough. Very generally, unfiltered irrigation water having a quantity of solid debris therein enters the device through inlet 14, passes through the diverter tube 20 and thence through a cylindrical screen member (described in greater detail below). The thus filtered water exits the device through the water outlet 16. As will be described in greater detail below, the unique design of the present invention creates a "dead water zone" 30 in the lower end 32 of the device, enhancing the ability of the device to separate the heavier (usually inorganic) particles entrained in the water stream. Periodically, relatively low specific gravity debris that has adhered to an inner surface of the screen member, and relatively high specific gravity debris that has settled in the bottom of the device, are flushed out of the water filtration device through the flush port 18.

As used herein, the term "irrigation water" refers to the distribution of unfiltered water for application to crops. However, while the impetus of the present invention was to solve filtration problems encountered in agricultural environments, it is to be anticipated that the inventive apparatus may find application to a broad range of uses. Therefore, as used herein, "irrigation" or "irrigation water" should be read to include any liquid containing solid debris that must be grossly filtered during distribution of the liquid. For example, the apparatus of the present invention can advantageously be applied to the water intake portion of a municipal drinking water facility when the water is drawn from a reservoir, as is often the case.

Figure 2:
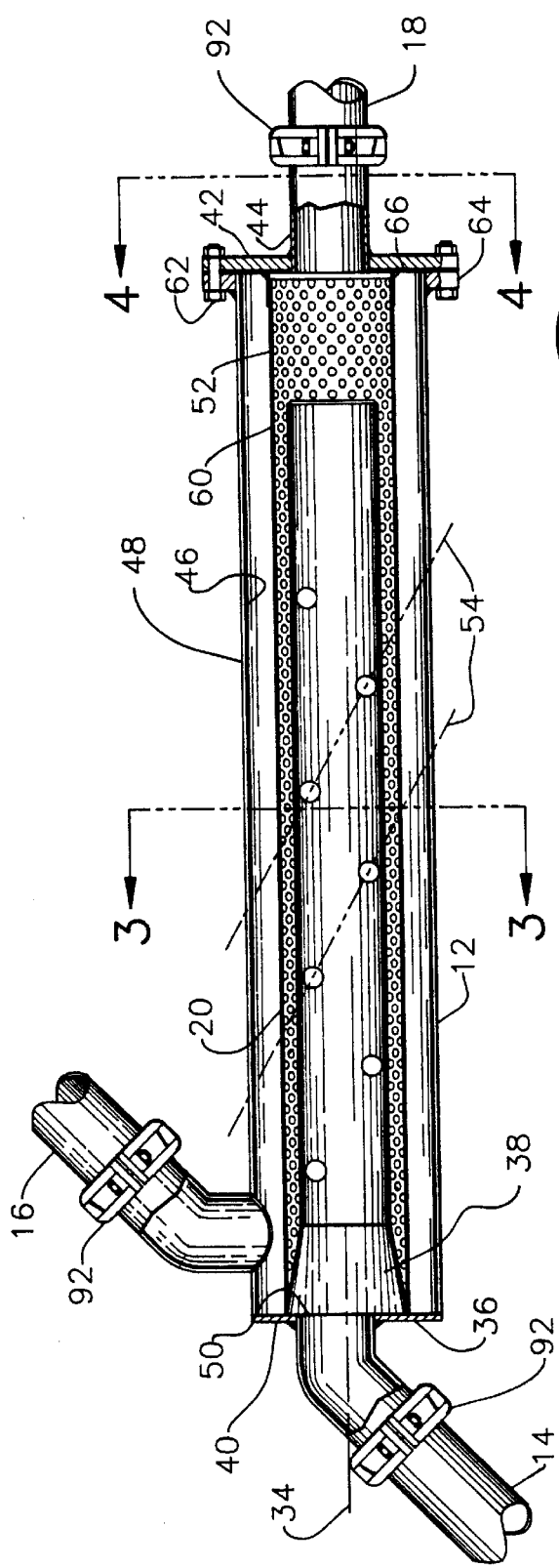
FIG. 2 is a longitudinal view, also in broken perspective, of the filter device of FIG. 1.

FIG. 2 is a broken longitudinal sectional view of the apparatus of the present invention, showing the filter element located in the interior of the assembly. The device is arranged about a longitudinal axis 34 which passes through the center of the device 10, and comprises the housing 12 and end pieces 40, 42 enclosing either end of the housing. Unfiltered irrigation water enters the upper inlet end 36 of the device generally aligned with the longitudinal axis 34. The water may be directed down the center of the housing 12 by means of a frusto-conical member 38, and in the preferred embodiment, exits the lower flush end 44 also in a direction generally aligned with the longitudinal axis 34.

It will be appreciated by those of skill in this art that the particular configuration illustrated, for example, in FIG. 2 is merely illustrative of the possible modes the invention may take. In its broadest sense, the present invention is not limited to a particular mechanical configuration, and those skilled in this art will immediately recognize a number of other possible embodiments the invention may take.

Returning to FIG. 2, there is positioned, between the diverter tube 20 and an inner surface 46 of housing 12, a screen member 48. The screen member 48 preferably extends from the inner surface 50 of end piece 40 to the inner surface 52 of end piece 42, creating a totally enclosed water filtration zone within housing 12. While the upper end of the diverter tube 20 is secured to the frustoconical member 38, the lower end 60 of the tube 20 preferably terminates "above" the surface 52.

The inlet 14 and outlet 16 conduits may be affixed to the housing in any appropriate manner, although because it is unlikely one would desire to modify a configuration, it is believed most desirable to fixedly secure them by welding. Because the screen member 48 may need periodic replacement or extended cleaning, it is desirable to provide access to the interior of the device. Therefore, the end piece 42 is preferably removably affixed to the housing 12 as by bolting 62 the end piece 42 to a flange 64. The flange 64 may be welded to the flush end 18 end of housing 12. To provide a tight seal between the peripheral edge of the flange 64 and the end piece 42, a gasket (such as an "O" ring 66) comprised of any suitable material may be placed therebetween. The gasket 66 will prevent fluid from escaping from the interior of the housing 12, and will maintain the water pressure therein.

The apertures 22 provided in diverter tube 20 may be arranged in a spiral pattern (as in FIG. 2), in sequential rings around the tube (as illustrated by axes 54), in various other patterns or in no pattern at all. The critical feature of the apertures is to provide sufficient cross-sectional area of apertures to permit even dissipation of flow to allow for the dead water area at the flush end, thereby preventing the mixing of solid material with the water flowing through the device so that the solid material settles therefrom.

The screen member 48 is preferably made of stainless steel or other corrosion resistant material. The screen member 48 has a longitudinal axis coincident with the longitudinal axis 34 of the device. In the embodiment of FIG. 2, the screen member is preferably sized to snugly fit over the frustoconical member 38 on the upper end 36, and may be fitted about a ring or stop (not shown) affixed to the inner surface 52 of end piece 42.

Figure 3:
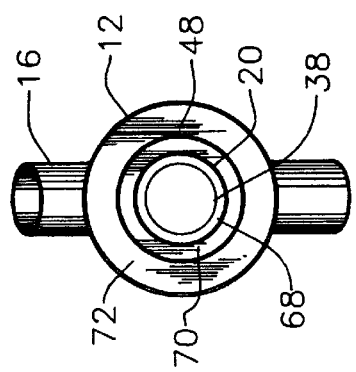
FIG. 3 is a cross-sectional view taken along lines 3—3 of FIG. 2.

As illustrated in FIG. 3, there is a central aperture 68 within the diverter tube 20, and an inner annular chamber 70 between the diverter tube 20 and the screen 48, and an outer annular chamber 72 between the screen 48 and the inner surface 46 of housing 12.

Figure 4:
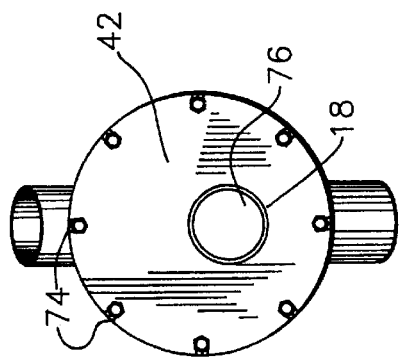
FIG. 4 is a partial cross-sectional view taken along lines 4—4 of FIG. 2.

As further illustrated in FIG. 4, the end piece 42 may be provided with a plurality of apertures 74 that serve as attachment points to the flange 64. The flush aperture 76 may be aligned centrally to the longitudinal axis 34, or may be offset as in FIG. 4. The diameter of the flush aperture 76 must be sufficient to discharge an excess of water over that entering through inlet port 14.

Figure 5:
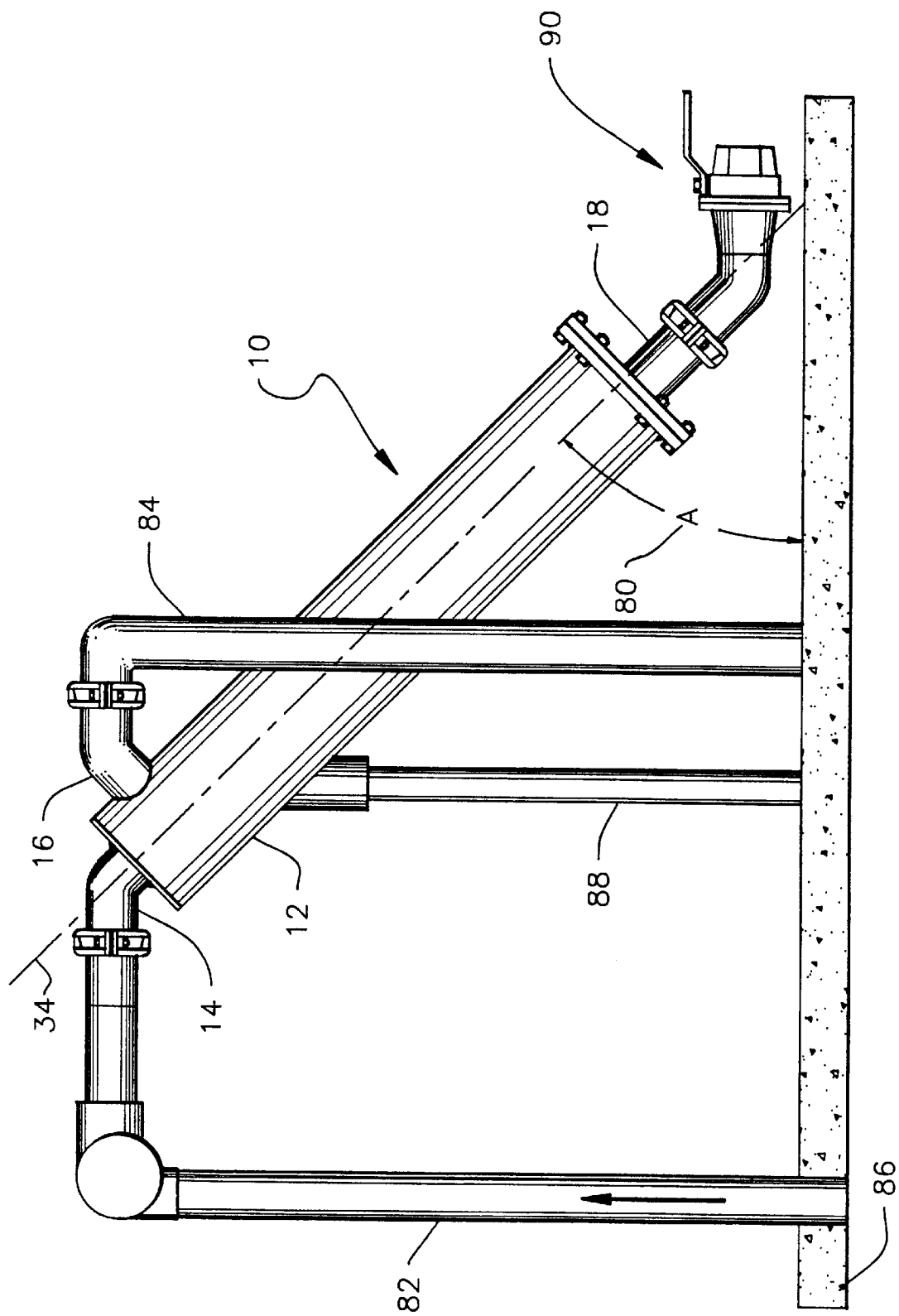
FIG. 5 is a perspective view of the filter device installed in a field environment.

The device of the present invention may be positioned at any point in the distribution of irrigation water. For example, the device may be placed at the origination point (a well head or adjacent a reservoir or canal), or may be adjacent a center pivot irrigation device. As illustrated in FIG. 5, the device 10 is aligned with the flush end 18 below the inlet end 14 to induce gravitational settling of the heavier inorganic debris such as sand. The longitudinal axis 34 of the device is preferably aligned at an acute angle "A" 80 to the horizontal. The device may be suspended from a rigid vertical inlet pipe 82 and outlet pipe 84, which are interconnected, respectively, to the inlet 14 and outlet 16 pipes, and which may be anchored, for example, in a concrete slab 86. The housing 12 may be further supported by a support member 88 releasably attached to the housing.

Figure 6:
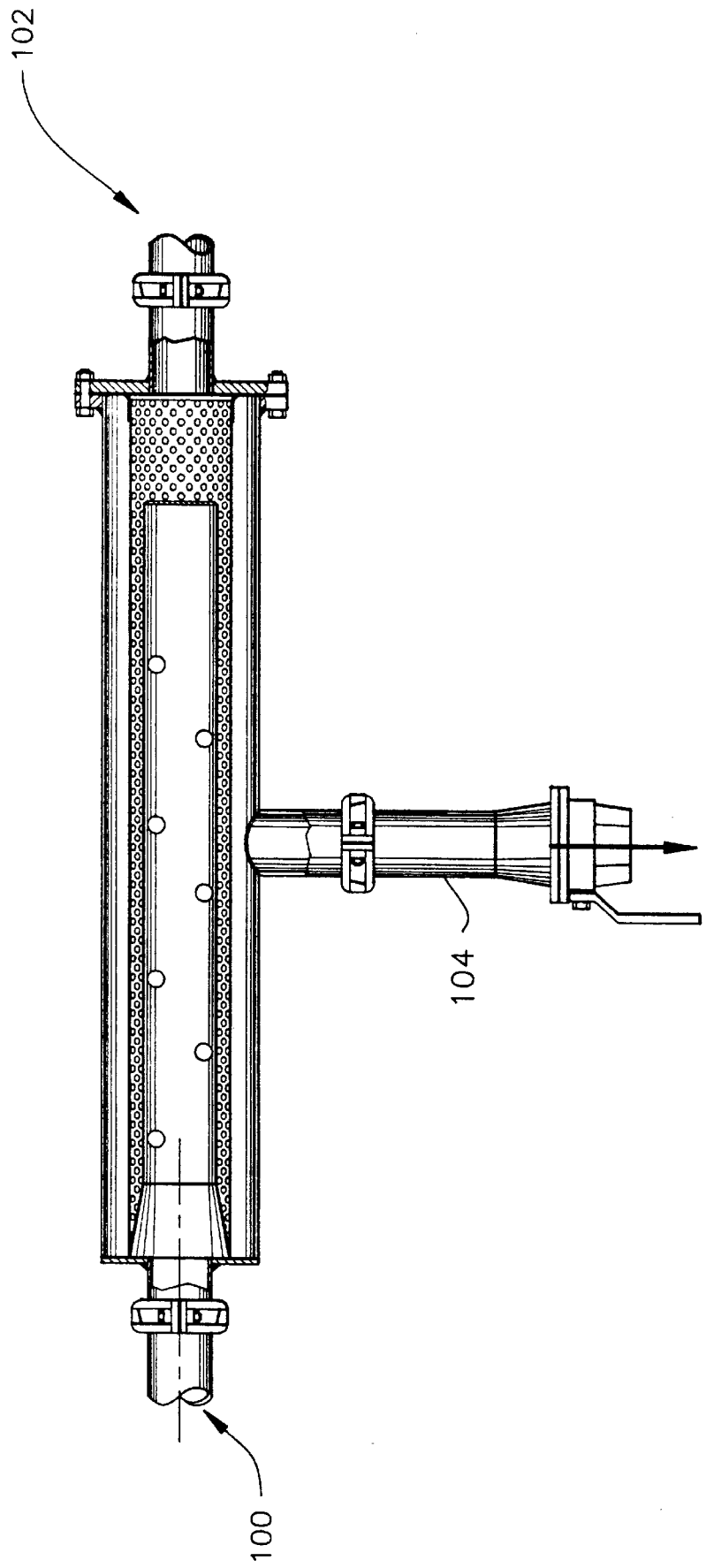
FIG. 6 is a sectional view of an alternative embodiment of the present invention.

Alternative to the embodiment of FIGS. 1–5, the device may be mounted horizontally as shown in FIG. 6. In this embodiment, the inlet 100 and flush 102 ports are aligned along the longitudinal axis of the device, and the outlet port 104 is aligned radially. Heavier inorganic matter may be more difficult to remove with this embodiment since it will settle out over a larger surface than in the embodiment of FIG. 1.

As illustrated, the flush pipe 18 may be interconnected to a valve member 90. Such valve may be either manually operable (as illustrated) or may be constructed with means (not shown) to automatically open the valve after a predetermined period of time. The inlet, outlet and flush pipes may be affixed to downstream piping with, for example, victaulic couplers with grooved weld-on nipples, illustrated schematically at 92.

Having thus set forth a preferred construction for the filter assembly of this invention, it is to be remembered that this is but a preferred embodiment. Attention is now invited to a description of the use of the filter assembly, wherein the apparatus was used to filter out suspended matter carried by irrigation water to be dispersed through an irrigation sprinkler assembly having relatively small apertures easily clogged by organic or inorganic suspended matter. While the device is described hereinafter in connection with a water delivery system, the device is operable with any liquid having entrained debris that must be filtered prior to use of the liquid.

The flow characteristics of an actual apparatus constructed according to the principles disclosed herein were measured. The dimensions of the apparatus were:

1. Inside diameter of housing 12: 10"
2. Inside diameter of perforated screen 48: 6"
3. Inside diameter of diverter tube 20: 4"
4. Inside diameter of inlet (14), outlet (16) and flush (18) pipes: 4"
5. Diameter of apertures 22: ¾"
6. Screen (48) mesh: %4"
7. Angle "A" when mounted: 45°
8. Flow rate in inlet pipe (14): 500 gpm
9. Flow rate out through outlet pipe (16): 500 gpm The device was operated over a period of 24 hours per day for an extended period of time. While the outlet water was not collected for measurement of debris therein, the performance of impact sprinklers downstream of the device was monitored, and no clogging of 5/32" diameter orifices was observed. When the water was shut off to the device, and the end piece 42 removed, a quantity of inorganic material, mostly sand, was collected and then drained therefrom. When removed, the screen was observed to have a quantity of inorganic material adhered to the inner surface thereof.

In a second test, the device was operated in a highly contaminated water stream for a period of 6 hours, and then the flush valve 90 was opened. The water immediately exiting appeared to have be brownish in color and have a significant quantity of both sand and organic material contained therein.

During normal operation of the device, a significant portion of the water entering the housing 12 along the longitudinal axis 34 will naturally exit the device through the apertures 22. The specific proportion of water flowing through apertures 22 can be regulated by the size and spacing (the "% open area") of apertures on diverter tube 20. A further portion of the water continues through the diverter tube 20 and impacts on the inner surface 52 of the end piece 42. The lighter weight inorganic material (having a specific gravity of approximately 1.0, or less) tends to be carried through the apertures and onto the screen 48. The heavier inorganic matter (generally having a specific gravity greatly in excess of 1.0) remains entrained in the water stream and is carried longitudinally through the diverter tube. A "dead zone" is thereby created which tends to cause the heavier debris to settle out in the lowermost portion of the housing 12. The dead zone results from the reduced-diameter diverter tube 20 and the number and size of apertures 22. Water is diverted through the apertures and the velocity of the water moving to the end of the diverter tube slows, allowing gravity to induce the heavier material to settle to the lower end of the filter assembly where it is discharged. The size and number of apertures will vary depending on the desired flow rate and the level of organic/inorganic contamination of the water stream.

During filtering operation, the water pressure on the "inside" of the screen is greater than the water pressure "outside" the screen, thereby forcing water from radially inside to radially outside the screen member, and retaining organic matter on the inner surface of the screen. During cleaning, the water inlet is maintained open with water flowing into the device as the flush valve 90 is opened (either manually or automatically). Because the flush aperture is open, and has a capacity at least as great as the water inlet port 14, water flows essentially straight through the device, and does not flow through the apertures in the diverter tube and thence through the screen 48. Therefore, there is very little, if any, "outward" water pressure against the inner surface of the screen member 48. The "back pressure" of water radially outward of the screen between the screen and the irrigation sprinkler is greater than the "outward" water pressure, forcing water to back flush through the screen in a direction opposite from the normal water flow. Such back flush cleans debris off the inside of the screen and causes it to flow down to the flush pipe between the screen 48 and the diverter tube 20. Therefore, a single flush through the valve 90 cleanses the device of both the heavier debris settled in the housing by gravity and the lighter debris entrained on the inside of the screen 48.

The frequency of flushing necessary to maintain adequate flow rate through the device will be determined by the relative cleanliness of the water stream. Obviously, the dirtier the water stream, the more often the device must be back flushed. The back flush cleaning method described above will remove most of the lighter debris entrained on the screen, however annual cleaning of the screen member by hand may be advantageous to remove matter not removed by back flushing.

It will be seen that the embodiments set forth above provide a novel filtering apparatus. It will be further apparent that numerous changes or modifications to the device disclosed herein may be made without departing from the scope of the invention. It is intended that all matter contained in the above description or shown in the accompanying drawings shall be interpreted as illustrative and not in a limiting sense. The scope of the invention should be limited solely by the scope of the claims appended hereto.

I claim:

1. An in-line water filter apparatus for removal of solid debris from a water stream, comprising:
   a. an elongate outer casing member having a first end and a second end, aligned about a longitudinal axis;
   b. a water inlet at the first end of said outer casing adapted to direct water into said outer casing along the longitudinal axis;
   c. a water outlet positioned adjacent the first end;
   d. a diverter tube in fluid communication with the water inlet, positioned within the outer casing, aligned along the longitudinal axis and defining a plurality of water diffusing apertures on the surface thereof;
   e. a screen member extending from the first end to the second end and disposed between the outer casing and the diverter tube; and
   f. a flush member at the second end of the outer casing.

2. The apparatus of claim 1, wherein the apertures defined in the diverter tube are aligned in a generally spiral configuration on the surface of the diverter tube.

3. The apparatus of claim 1, wherein the water inlet is provided with a reducer device to direct substantially all of the water into the diverter tube.

4. The apparatus of claim 1, wherein the length of the screen member is equivalent to an inside dimension of the outer casing along the longitudinal axis, and the length of the diverter tube along the longitudinal axis is less than the length of the outer casing member.

5. The apparatus of claim 1, wherein the longitudinal axis of the apparatus is aligned at an acute angle to a horizontal surface of ground underlying the apparatus.

6. The apparatus of claim 1, wherein the flush member is aligned about the longitudinal axis, such that when the flush member is opened, the water stream is directed along the longitudinal axis through the device and out the flush member, thereby reducing the water pressure within the screen member to an amount less than the water pressure between the screen member and the outer casing.

7. The apparatus of claim 6, wherein the flush member is sized to permit passage of all water entering the apparatus to be removed therefrom.

8. The apparatus of claim 6, wherein the flush member further comprises an automatic valve to open the flush member on a predetermined cycle time.

9. The apparatus of claim 1 wherein the water outlet is aligned generally perpendicular to the longitudinal axis.

10. A method of removing solid debris from a water stream, comprising the steps of:

a. positioning an elongate filter apparatus at an acute angle to a support surface such that said apparatus is provided with a first upper end and a second lower end;

b. directing unfiltered water into the first upper end of an outer casing of the elongate filter apparatus along a longitudinal axis of said apparatus such that the water enters a perforated diverter tube;

c. forcing a substantial quantity of said water radially through a plurality of perforations in said diverter tube and thence through a screen member positioned between the diverter tube and outer casing;

d. permitting a heavier fraction of solid debris to settle out of the water stream at the second lower end of the apparatus and removing a lighter fraction of solid debris from the water stream on a radially inner surface of the screen member;

e. opening a flush member at the lower end of the apparatus such that the pressure radially inside said screen member is lower than the pressure radially outside said screen member, thereby removing the heavier fraction from the lower end and the lighter fraction of solid debris from the inner surface of the screen member.

11. The method of claim 10, further comprising the step of settling out the heavier fraction of solid debris by creating a dead zone in the lower end of the apparatus.

* * * * *